Figure 1:
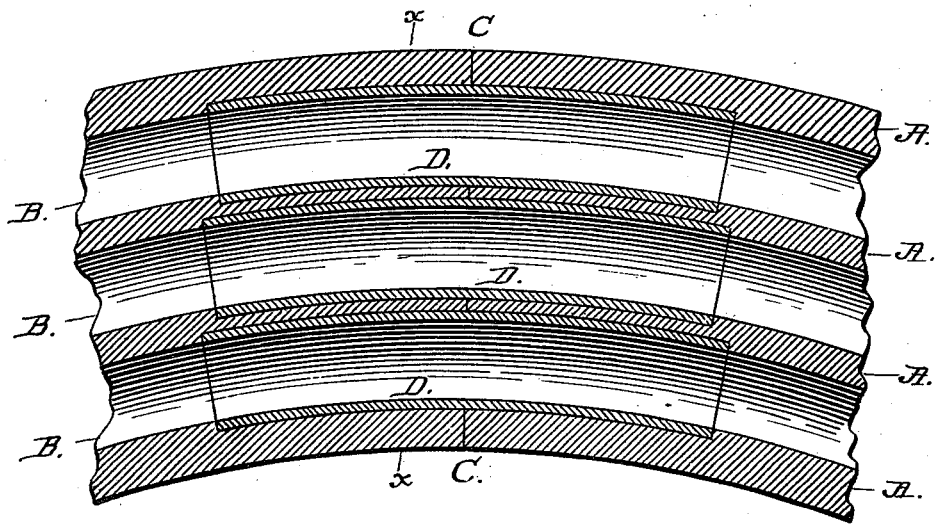

No. 642,776. Patented Feb. 6, 1900.
J. C. ANDERSON.
TIRE.
(Application filed Aug. 11, 1899.)

(No Model.)

WITNESSES:
INVENTOR
Jas. C. Anderson
BY
ATTORNEY

UNITED STATES PATENT OFFICE.

JAMES C. ANDERSON, OF HIGHLAND PARK, ILLINOIS.

TIRE.

SPECIFICATION forming part of Letters Patent No. 642,776, dated February 6, 1900.

Application filed August 11, 1899. Serial No. 726,887. (No model.)

*To all whom it may concern:*

Be it known that I, JAMES C. ANDERSON, a citizen of the United States, residing at Highland Park, in the county of Lake and State of Illinois, have invented certain new and useful Improvements in Tires; and I do hereby declare the following to be a full, clear, and exact description of the invention, such as will enable others skilled in the art to which it appertains to make and use the same.

My invention relates to certain new and useful improvements in tires for carrying heavy loads.

In the use of autotrucks it has been found necessary to employ tires with a very wide tread in order to secure the necessary traction and at the same time prevent the natural tendency toward slipping. In meeting these demands two suggestions have been made as the most desirable—viz., a pneumatic tire and a solid rubber tire. Both of such tires have inherent disadvantages aside from first cost in production.

In the pneumatic tire there exists the liability to puncture, and as the process of vulcanization is necessary in the first instance of manufacture and is likewise necessary in repairing punctures and as the rubber compound will not permit more than two treatments by vulcanization without becoming deteriorated, if not practically destroyed, the number of times a tire may be practically repaired is accordingly limited, while the number of times it may be punctured is not limited. Hence frequent replacement is necessary, and this renders their use almost prohibitive. Another disadvantage in the use of pneumatic tires lies in the fact that when punctured they immediately become deflated and cannot be used until repaired without great destruction to the tire and wheel. Out of these conditions has grown the suggestion and use of solid rubber tires, but their use is undesirable for many reasons, among which may be stated the excessive first cost, the undue weight, and the difficulty at least, if not impossibility, of preventing the creeping movement without the rim, which, as is well known, soon disintegrates the rubber on the surface contacting with the rim, thus increasing its interior diameter and rendering it loose upon the rim.

My invention has for its primary object to provide a tire which shall have all of the characteristics of the pneumatic tire and which shall be less liable, if not wholly proof, against incapacitating puncture and which will not require of necessity the employment of the vulcanizing process to join the ends of the tube constituting the tire.

In order that those skilled in the art may know how to make my improved tire and to fully appreciate all the advantages thereof, I will proceed to describe it, referring by letters to the accompanying drawings, in which—

Figure 2:
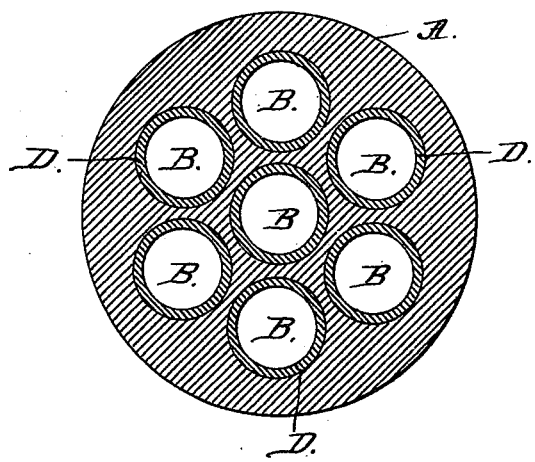

Figure 1 is a longitudinal central section of a portion of a tire embodying the features of my invention. Fig. 2 is a transverse section on the line $x$ $x$ of Fig. 1.

Similar letters of reference indicate like parts in both figures of the drawings.

Referring particularly to Figs. 1 and 2, A represents the body of the tire, cylindrical in cross-section, with a series of circumferential air chambers or cells B preferably arranged relatively to each other, as shown, but in all cases so that a portion of the solid body A shall intervene between the several air chambers or cells and also surround and confine said chambers or cells as a group. The arrangement thus described will, it may be seen, render it practically impossible to puncture more than one air-chamber at any one time, and consequently such an accident would not incapacitate the tire to but a limited extent and as a whole it would not become deflated and useless, as would be the case with an ordinary tire.

In an application filed by me on July 21, 1899, Serial No. 724,682, I have illustrated a tire with a solid body portion surrounding a main inflatable and deflatable chamber provided with a valve and a series of separated air cells or chambers charged with liquid air or equivalent body; but in my present invention it will be seen that I dispense entirely with the main inflatable and deflatable chamber and provide a series of cells all of which are permanently and highly inflated during the manufacture of the tire and bearing such relation to the body of the same as to render necessary for its use a wheel of peculiar construction.

In order to secure the ends of the tube constituting my improved tire, and which are shown at the line C in Fig. 1, I employ a series of internal comparatively short tubes D, of rubber or similarly-resilient material, the internal diameter of which is equal to the internal diameter of the air chambers or cells B at each terminal of the tubes D, and consequently the air chambers or cells B are enlarged at their meeting ends to a degree equal to the thickness of the cylindrical wall of the tubes D, so that the continuity and diameter of the air-chambers will not be broken by an inward projection or shoulders of the ends of the tubes D.

In securing the tubes D in place one end of its body, being first coated with a suitable cement, is forced into the enlarged cylindrical recess in one end of the tire A. When all of the tubes have been thus located within one end of the tire, the opposite end thereof is placed so that the projecting ends of the tubes D, which have previously been coated with suitable cementing material, will enter the recesses in that end of the tire, and the latter is forced toward the opposite end thereof and over the ends of the tubes D into position, as shown at Fig. 1. The ends of the tire are also coated with cement, which when dry will join, as shown at the line C. Previous to the manipulation of the ends of the tire to join the same the air chambers or cells B are charged with liquid air or its equivalent, as explained in the application hereinbefore referred to, and when the tire is completed the contained air will have become highly expanded and press with equal force against the walls of the air chambers or cells in such manner that the circular contour of the tread of the tire will not be disturbed and not distended in the form of a lump or projection, as would be the case if the joining tubes D had their ends extending shoulder-like into the air-chambers B.

The contained air in the tire of my improved construction not only holds the tire in its properly-distended form, but likewise holds the walls of the several connecting-tubes firmly and against any tendency to separate from the cement juncture between them and the embracing walls of the air-chambers.

One of the advantages resulting from the use of comparatively small connecting-tubes surrounded individually and as a group by the comparatively self-sustaining body of the tire-tube A is the fact that the joining tubes D will not buckle while they are being forced into their seats and no internal pressure becomes necessary to hold them in contact with the walls of the air-chambers during the period of time required to set or dry the cement.

I desire in this connection to draw especial attention to the fact that if a single-tube tire should have its ends joined by a single slip-joint internal tube and cement it would be absolutely necessary to provide some sort of internal expansive force to prevent the internal joint-tube from buckling, and where the internal tube in such a case has an exterior diameter equal to the internal diameter of the main or tire tubes the ends of the joining tube necessarily project within the air-space and constitute shoulders against which the contained expansive body presses and tends to not only increase the buckling action during the cementing process, but in a completed tire inflated in the usual or any desired manner for use upon a vehicle the compression and movement of the contained air under the influence of weight imposed upon it will operate against the shoulders or ends of the walls of the inner tube in an obvious manner and tend to force the ends of the tire-tube apart. None of these disadvantages exists in my improved tire.

As my improved tire is inflated permanently after the ends are joined during the process of manufacture and, unlike the tire illustrated in my pending application hereinbefore referred to, cannot be collapsed for removal from the rim of an ordinary wheel, I therefore use it in connection with a wheel constructed as shown in divisional application Serial No. 728,443, and which involves a construction which permits the removal of one flange of the rim and its subsequent replacement after the tire has been properly located.

Having described the construction and advantages of my improved non-deflatable tire and the wheel especially adapted for its use, what I claim as new, and desire to secure by Letters Patent, is—

A non-deflatable tire composed of a body portion A, of rubber or equivalent materials, having a series of circumferential air-chambers B surrounded individually and as a group by the solid body portion and permanently inflated by a highly-expansive body, the ends of the body being secured together by resilient tubes D located within enlarged spaces within the ends of the air-chambers B, the walls of the air-chambers and the inserted connecting-tubes D, and also the ends of the body A, all cemented together substantially as and for the purpose hereinbefore set forth.

In testimony whereof I affix my signature in presence of two witnesses.

JAMES C. ANDERSON.

Witnesses:
JENNIE G. BOOTH,
EDWIN L. BRADFORD.